US008443321B1

(12) United States Patent
Fender et al.

(10) Patent No.: US 8,443,321 B1
(45) Date of Patent: May 14, 2013

(54) PESSIMISM REMOVAL IN THE MODELING OF SIMULTANEOUS SWITCHING NOISE

(75) Inventors: Joshua David Fender, East York (CA); Kamal Patel, Campbell, CA (US); Navid Azizi, Markham (CA); Paul Leventis, Toronto (CA)

(73) Assignee: Altera Corporation, San Jose, CA (US)

( * ) Notice: Subject to any disclaimer, the term of this patent is extended or adjusted under 35 U.S.C. 154(b) by 842 days.

(21) Appl. No.: 12/137,407

(22) Filed: Jun. 11, 2008

(51) Int. Cl.
*G06F 17/50* (2006.01)

(52) U.S. Cl.
USPC .......................................... 716/111; 716/115

(58) Field of Classification Search ........... 716/132–136
See application file for complete search history.

(56) References Cited

U.S. PATENT DOCUMENTS

| | | | | |
|---|---|---|---|---|
| 6,507,935 | B1 * | 1/2003 | Aingaran et al. | 716/115 |
| 6,510,540 | B1 * | 1/2003 | Krauter et al. | 716/115 |
| 7,159,160 | B2 * | 1/2007 | Yoh et al. | 714/724 |
| 7,279,907 | B2 * | 10/2007 | Phoon et al. | 324/628 |
| 7,983,880 | B1 * | 7/2011 | Fender et al. | 703/2 |
| 2009/0077515 | A1 * | 3/2009 | Sinha et al. | 716/6 |

OTHER PUBLICATIONS

Chen et al., "Worst Case RLC Noise with Timing Window Constraints"; Feb. 2004; ACM/IEEE International Workshop on Timing Issues in the Specification and Synthesis of Digital Systems.
Chai et al.; "Temporofunctional Crosstalk Noise Analysis"; 2003; Design Automation Conference.
U.S. Appl. No. 12/034,400, filed Feb. 20, 2008, Fender et al.
U.S. Appl. No. 12/039,918, filed Feb. 29, 2008, Ravi.

\* cited by examiner

*Primary Examiner* — Binh Tat
(74) *Attorney, Agent, or Firm* — Womble Carlyle Sandridge & Rice, LLP

(57) ABSTRACT

Methods for determining induced noise on a given victim by a set of aggressor signals are presented, and for identifying the worst case aggressor switching time alignment that causes the worst case victim noise. The method removes circuit analysis pessimism related to simultaneous switching noise (SSN) in a circuit design tool by determining physically impossible combinations of victim-aggressor input/output (I/O) pins in a circuit design and culling out the impossible combinations from the list of possible victim-aggressor combinations. The method further performs a switching window SSN analysis of the circuit design with a common uncertainty removal algorithm taking into consideration the list of possible victim-aggressor combinations, and determines the maximum voltage noise induced on I/O pins of the circuit design. The results of the noise analysis are displayed to the user.

23 Claims, 10 Drawing Sheets

Even phase aggressors:

Maximum Profile    Swept Profiles    Victim Noise

Odd phase aggressors:

Minimum Profile    Swept Profiles

Odd Even and Nominal Profile Waveforms

PESSIMISM REMOVAL IN THE MODELING OF SIMULTANEOUS SWITCHING NOISE

BACKGROUND

The present invention relates to methods for removing circuit analysis pessimism related to simultaneous switching noise (SSN) in a circuit design tool.

It is a difficult task to verify that a system design, under the influence of simultaneous switching noise (SSN), meets a required noise margin. Existing simulation techniques can be used to predict the magnitude of a noise event caused by a given set of aggressor signals on a victim pin, but these techniques do not address how to determine the set of aggressors or how to interpret the resulting noise. The naïve approach of assuming all possible pins are aggressors, and that any noise spikes that cross into the switching region of an input buffer is a failure, presents too many false failures.

Examples of where the naïve approach predicts failures, when none are seen in practice, are PCI (Peripheral Component Interconnect) and DDR (Double data rate) buses. Both of these buses incorporate high drive strength output buffers which are capable of inducing significant amounts of SSN voltage noise. These buses function properly because aggressors and victims are synchronously aligned. This alignment guarantees that the noise event occurs when the bus signals are switching and the receiver is not sampling. Under this condition, a violation of the input threshold, due to noise, is not a real failure.

It is in this context that embodiments of the invention arise.

SUMMARY

Methods for determining induced noise on a given victim by a set of aggressor signals and for identifying the worst case aggressor switching time alignment that causes the worst case victim noise are presented. Fundamental to this methodology is the ability to determine when a victim signal is being actively sampled by a receiver and filtering out noise events accordingly.

In one embodiment, a method removes circuit analysis pessimism related to simultaneous switching noise (SSN) in a circuit design tool by determining physically impossible combinations of victim-aggressor input/output (I/O) pins in a circuit design and culling out the impossible combinations from the list of possible victim-aggressor combinations. By reducing the number of possible aggressors, the method lowers the amount of possible noise induced on a victim, and thus removes pessimism for noise inducing cases that do not have real-life implications. The method further performs a switching window SSN analysis of the circuit design with a common uncertainty removal algorithm taking into consideration the list of possible victim-aggressor combinations, and determines the maximum voltage noise induced on I/O pins of the circuit design. The results of the noise analysis are displayed to the user to assess the noise implications of a particular I/O pin configuration. In another embodiment, the method uses the switching window SSN analysis of the circuit design with a common uncertainty removal algorithm to analyze timing noise on a given victim pin.

In another embodiment, a method to remove circuit analysis pessimism related to simultaneous switching noise (SSN) in a circuit design tool is presented. The method determines physically impossible combinations of victim-aggressor input/output (I/O) pins in a circuit design by culling out a list of possible victim-aggressor combinations. Then, the method performs a switching window SSN analysis of the circuit design with a common uncertainty removal algorithm and the list of possible victim-aggressor combinations. A worst timing noise induced on I/O pins of the circuit design is determined, and the worst timing noise is then displayed.

It should be appreciated that the present invention can be implemented in numerous ways, such as a process, an apparatus, a system, a device or a method on a computer readable medium. Several inventive embodiments of the present invention are described below.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

Methods and systems to remove circuit analysis pessimism related to simultaneous switching noise (SSN) in a circuit design tool are provided. The method determines what are the physically impossible combinations of victim-aggressor input/output (I/O) pins in a circuit design in order to cull out the impossible combinations from the list of possible victim-aggressor combinations. The method further performs a switching window SSN analysis of the circuit design with a common uncertainty removal algorithm using the list of possible victim-aggressor combinations. Then, a maximum voltage noise induced on I/O pins of the circuit design is determined. The results are then presented to the user, for example by displaying the determined noise in a computer monitor.

Simultaneous switching noise (SSN) is defined as a noise voltage induced onto a single victim I/O pin of an electronic component due to the switching behavior of other aggressor I/O pins in the device. This voltage noise can cause device operation failures either by violating input voltage thresholds or by changing delays such that timing is no longer met. The design of reliable electronic systems requires that SSN be effectively managed.

In general, SSN is a very difficult problem to accurately analyze. There are many different parameters that can affect the magnitude of SSN noise, many of which can be difficult to determine. The problem is even more difficult when it is considered in the context of field-programmable gate arrays (FPGA). Unlike an application-specific integrated circuit (ASIC), that has a fix pin-out and fixed pin functionality, an FPGA is a customizable device for which the user has the flexibility to select the pin-out, I/O buffer types, as well as the I/O timing and functional relationships.

Existing solutions for analyzing FPGA SSN typically involve reducing the underlying model complexity by making a number of simplifying assumptions. These assumptions trade off analysis accuracy for ease of use. The simplifications are usually made in such a way that the results of the simplified analysis are more pessimistic than the results from an ideal analysis. The idea being that if a design is found to work, given a pessimistic analysis, then the same design will work even better given the better performance of the actual FPGA. The down side of this approach is that the pessimistic analysis can report SSN failures that would not actually be failures on real devices.

One of the most common simplifying assumptions for SSN modeling relates to the identification of what set of switching aggressors causes the worst case SSN noise to be induced on a given victim pin. The most pessimistic approximation is to assume that every pin, besides the output, switches at the same time. In practice this is not always the case, due to physical timing and circuit functionality relationships.

Figure 1:
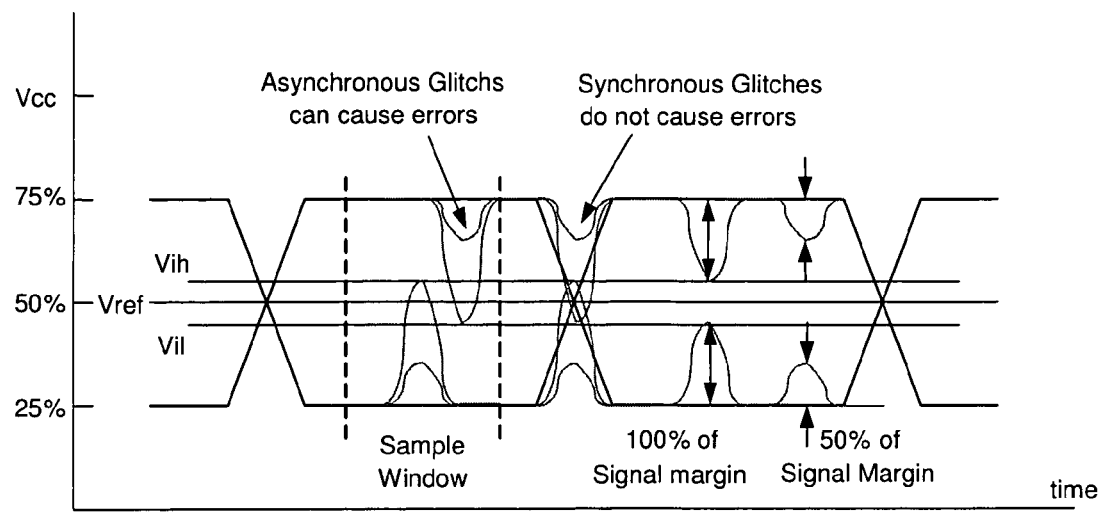
FIG. 1 depicts the effects of noise on a signal and the sensitivity to noise for the different types of interference.

Another common assumption is that any noise event that causes a victim pin to cross into the switching region of a receiver should be flagged as a failure, but this is not always the case. FIG. 1 depicts the effects of noise on a signal and the sensitivity to noise for the different types of interference. Glitches can occur outside of the sampling window of a receiver. Typically these noise events are caused by aggressors that are synchronously related to the victim. These noise events can affect the switching time of a victim but should not be considered as an input threshold violation failure.

The embodiments of the present invention present methods for removing the two assumptions by considering physical timing and circuit functionality relationships when performing SSN analysis and by filtering the result through the use of victim sensitivity window information. The resulting analysis using the disclosed techniques is less pessimistic than one in which these assumptions are not made.

Switching window techniques are commonly used for reducing pessimism when analyzing on-die cross talk. Published methods fall into two major categories. The first category relates to the problems where the desire is to the find switching time of aggressor buffers such that the noise pulse or timing noise is maximized. The second category of published work relating to reducing pessimism using switching window analysis involves the more difficult form of crosstalk aware timing analysis. This problem is significantly different than the first category of work because it deals with multiple layers of logic and interconnects. The complexity of the problem arises from the fact that the switching window and cross talk problem is coupled because cross talk can change timing and the amount of cross talk is in turn dependent on the timing of the aggressors.

Existing solutions for using timing windows to reduce cross talk estimation pessimism typically make the assumption that the system can be approximated as a linear time invariant (LTI) system. Under this approximation the worst case peak noise considering globally referenced switching windows can be found very easily.

Figure 2:
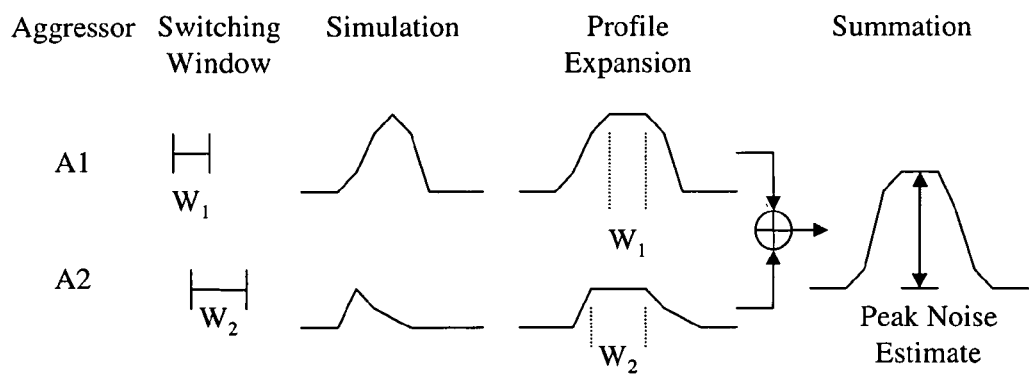
FIG. 2 describes adding two signals using switching windows to sweep induced noise on a victim pin to determine worst case aggressor alignment according to one embodiment.

FIG. 2 describes adding two signals using switching windows to sweep induced noise on a victim pin to determine worst case aggressor alignment according to one embodiment. For each aggressor, a simulation is performed with only that aggressor switching while other aggressors are held quiet. The resulting victim noise waveform is represented in the simulation column of FIG. 2. Using the switching window for each aggressor, $W_1$ for A1, and $W_2$ for A2, an expanded profile waveform is created by sweeping the simulation waveform across the switching window. Mathematically this operation can be described as:

$$f_{sweep}(t) = \max(f(t-t_{sweep}) \text{ for } t_{sweep} \text{ between delay}_{min} \text{ and delay}_{max})$$

Where f(t) is the simulation waveform and $f_{sweep}(t)$ is the profile waveform. The resulting profile waveforms are then summed together. The maximum value of the summed waveform is equal to the worst case induced noise, assuming the LTI assumption holds.

The exact switching times are determined by identifying the time at which the peak noise event occurs in the summed waveform, and then finding for each aggressor the switching time that is within the specified switching window and maximizes the noise value at the time identified previously.

Naïve cross talk analysis on multiple logic levels very easily be excessively pessimistic. Two major sources of pessimism are caused by ignoring either temporal or functional relationships between aggressors and victim pins. Temporal relationships provide constraints on when signals can switch relative to each other. A simple switching window analysis methodology can incorporate these relationships for single level cross talk analysis but for multilevel analysis this becomes more challenging.

The functional relationship problem for multilevel analysis involves finding aggressor combinations that are physically impossible due to the structures of logical circuits. For example, two aggressors that are complemented versions of each other can never switch in the same direction.

Several techniques exist for dealing with common path pessimism removal (CPPR) in the context of static timing analysis (STA). Put simply, common path pessimism is caused when a minimum—maximum delay analysis is performed assuming a single globally referenced time base. If the delay analysis being performed, such as a register to register transfer, involves common min/max uncertainty the result can be excessively pessimistic. For STA, this is a difficult problem because it requires path level analysis which can be quite computationally complex.

In one embodiment, a method for determining the worst case SSN induced voltage noise and worst case timing noise is presented. The method uses switching window analysis to reduce cross talk pessimism and performs several operations geared to handle I/O specific problems. In particular, the methodology has been extended to deal with common path pessimism, source synchronous victim sensitivity windows, unrelated clock domains, physical circuit enforced constraints, and the ability to determine worst case timing noise instead of just worst case voltage noise.

The method uses several inputs. One embodiment provides a method for determining the worst case peak SSN induce voltage noise and the worst case SSN induced timing push-out or pull-in by assuming the SSN model is close to being linear time invariant, or in other words, the SSN model behaves linearly. The methodology accounts for many common sources of pessimism. In particular, the methodology utilizes the following information to avoid much of the pessimism caused by ignoring timing and functional constraints related to a circuit's physical structure: a timing forest, common output enable signal constraints, exclusive output enable signal constraints, and exclusive activity signal constraints. The timing forest, or set of trees, contains min-max (minimum and maximum) output timing path information for each aggressor and min-max sensitivity window information for each victim.

The method requires the availability of an SSN model capable of generating noise waveforms based on given aggressor switching information. If the underlying SSN model produces peak noise voltages rather than noise waveforms the techniques described in this embodiment can still be used by generating a noise waveform whose shape is a constant value equal to the peak noise. This approximation introduces additional pessimism over the method where actual waveforms are used, but the approximation results in less pessimism than if the peak noise is used without the method's techniques described in this invention.

Figure 3:
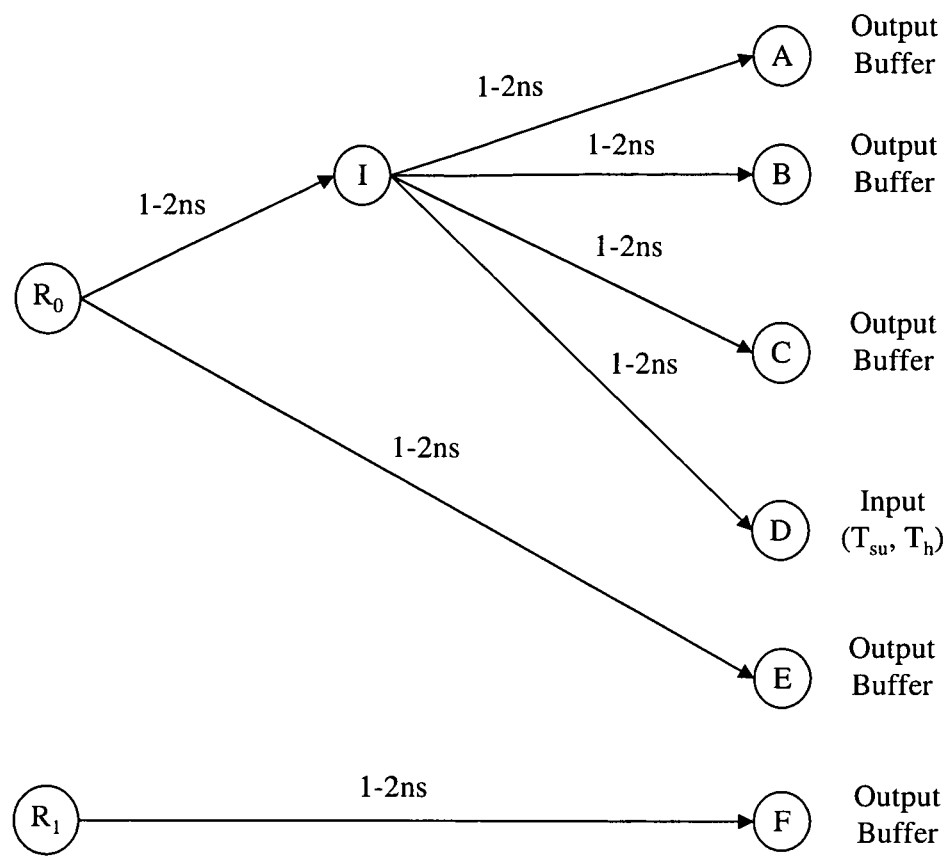
FIG. 3 shows a sample timing forest with two independent clock domains.

The purpose of the timing forest input is to encapsulate aggressor output timing and victim sensitivity window timing in a form suitable for later use. FIG. 3 shows a sample timing forest with two independent clock domains. The timing forest shown in FIG. 3 is just one example of a timing structure that can be used in the different embodiments of this invention, however different structures can also be used with this invention.

In FIG. 3, there is one tree for each unrelated clock in a design. Related clocks live in the same tree and share a common time reference point. $R_0$ and $R_1$ are root nodes for two timing trees and act as the time reference points for each tree. I is an internal node where the timing path diverges. A, B, C, E and F are output buffer nodes and D is an input buffer node. It should be noted that the timing graph has the shape of a tree because I/Os typically do not have re-convergent paths.

Each edge of the graph is annotated with a minimum and a maximum delay. The switching window time of a leaf node is determined by adding the delays from the root to the leaf node. For example, node C has a switching window of [2-4 ns]. The internal nodes enable common path pessimism removal because the sharing of the clock signal is explicitly specified.

Input buffer leaf nodes require additional sensitivity information to allow for proper result filtering. The input buffer nodes are annotated with the required setup ($T_{su}$) and hold times ($T_h$) relative to the arrival time of the node itself. In one embodiment, the graph is constructed by combining conventional timing analysis techniques with user specifiable constraints providing any missing input $T_{su}$ and $T_h$ delays.

There are two types of output enable signal constraints: common output enable groups and intergroup exclusion relationships. The common output enable group specifies that a set of I/O pins share a common output enable signal, meaning that all pins in the group act as inputs, outputs, or tristated outputs at the same time. The second constraint, intergroup exclusion relationships, specifies that two output enable groups are prevented from both being enabled at the same time. This can result from physical properties of a given circuit, such as the enable signals being complemented versions of each other, or because of more complicated circuit state relationships.

Constraints relating to the output enable relationships can either be specified manually or automatically extracted from a netlist using existing netlist traversal algorithms. Most output enable group constraints can be found by identifying output enable signals driven by the same net. More advanced netlist examination can find further common output enables by recognizing that different nets are logically equivalent. For example, an output enable signal might be buffered to account for high fan out resulting in multiple output enable net names that are all logically equivalent. Finally, there can be multiple output enable signals that are not logically identical but are always active at the same time due to circuit design. These types of relationships are difficult to find automatically but can be specified manually or extracted from functional simulations.

Similarly, the intergroup exclusion relationship constraints can be specified manually or automatically extracted from a netlist. Existing netlist traversal algorithms are used to determine basic exclusion relationships, such as two output enable group signals being complemented versions of each other. More complicated circuit functionality relationships are hard to automatically extract and can be specified manually.

The method also uses pin activity signal constraints in one embodiment. A simple form of a circuit enforced output switching constraint is the constraint that two outputs can not be actively switching at the same time. This type of constraint is an activity exclusion constraint. The activity exclusion constraint is similar to the intergroup exclusion constraint for output enable signals but instead indicates that if one pin is actively toggling then the other pin must be driving a constant value. The only difference is that the underlying SSN noise model can generate different noise results for pins that are tristated versus pins that are outputs but driving a quiet voltage. This type of constraint can be automatically extracted from a netlist using existing netlist traversal techniques or specified manually. Typically, the activity exclusion constraints can be generated by considering circuit state information or flip-flop enable signal logic, however, other sources of information can also be used.

There are two primary stages of the SSN analysis methodology. In one embodiment, the first stage uses both the output enable and switching activity constraints to cull out some physically impossible victim-aggressor combinations. This first stage is followed by the application of the switching window SSN analysis with common uncertainty removal algorithm. The method is first described for determining maximum voltage noise with some comments regarding timing noise analysis. Determining maximum timing noise requires a modification to the voltage noise method and is described following the voltage noise method.

In the first stage, the impossible victim-aggressor combinations are culled. Depending on the type of SSN analysis being performed, voltage noise or timing noise, it is often possible to cull pins from the aggressor list by using the physical circuit derived constraints. The following operations are used to cull potential aggressors:

1. Select a victim pin of interest.
2. Create a candidate aggressor list with every pin in the design except the victim pin.
3. If the victim pin is bi-directional and is configured as an input, cull any aggressors in the candidate list that belong to the same output enable group.
4. If the victim pin is configured as an output, cull any aggressors in the candidate list that have an intergroup exclusion constraint relating the victim pin output enable group to the aggressor pin output enable group.
5. If the victim pin is an output and a timing noise analysis is being performed, then cull any pins that have a switching activity exclusion constraint.

Operation 3 captures the physical fact that it is impossible to have two pins with a common enable signal acting as one input and one output. Operation 4 captures the opposite fact, that is, if the victim and potential aggressor pins are prohibited from both being outputs at the same time, then the aggressor can never be an output when the victim is an output. Operation 5 captures the fact that in a noise analysis the victim pin is transitioning, meaning that any potential aggressor with an exclusion activity constraint can not be switching at the same time.

There are other restrictions on which pairs of aggressors can be active at any time but the selection of which potential aggressor to select depends on the amount of noise the aggressor can induce. These types of restrictions are applied as part of the switching window analysis algorithm.

In stage two, the switching window SSN analysis with common uncertainty removal is performed. The core algorithm takes into account timing pessimism, sensitivity windows, and pair-wise constraints. The general idea is to create a profile noise waveform such that the noise value at any time point is equal to the worst possible value caused by the a worst case aggressor switching alignment for that time point. The profile waveform can be used to identify the worst possible noise value and time which can then be worked backwards to determine the alignment that caused this value.

Figure 4:
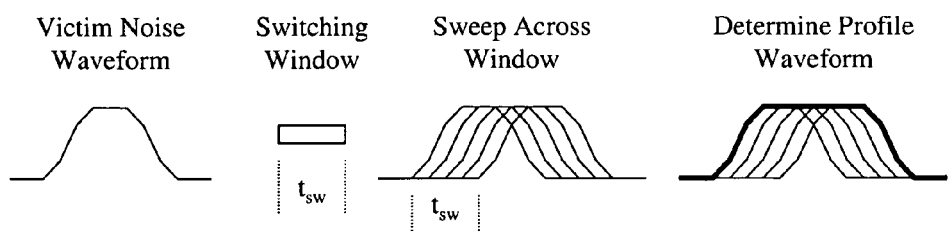
FIG. 4 shows the creation of a noise profile waveform in accordance to one embodiment of the invention.

FIG. 4 shows the creation of a noise profile waveform in accordance to one embodiment of the invention. In a simple case where there is one aggressor and one victim, the waveform on the left represents the noise induced on the victim pin due to the switching of the aggressor. The switching window column indicates that the aggressor is free to switch at any time during the period $t_{sw}$. This switching time freedom can be expressed by overlaying every possible switching time waveform and taking the maximum value at any time. This is represented as the waveform sweep process, where every waveform alignment is considered, and the maximum values of the waveforms are used to create a profile waveform. It should be clear that the profile waveform does not represent the physical shape of any one waveform but rather only indicates the maximum amount of possible noise at any given time. It can not be used to determine noise for more than a single point at a time.

The switching window analyses techniques operate on the timing forest structure. As the analyses progresses, multiple waveforms or input timing relationships numbers are stored on the nodes. Eventually, a single profile waveform that comprises all possible valid aggressor alignments filtered by all possible sensitivity windows is produced. The worst case noise number can be extracted from this profile waveform and the process reversed to determine the alignment that caused this value.

The method for creating the worst case profile waveform according to one embodiment begins with dividing the set of aggressors into individual sets, such that each set has aggressors that are compatible with each other and also have the same exclusive relationships as each other for pins outside of the set. This is because output enable and switching activity exclusion constraints between pins prevent many possible aggressor combinations.

The method continues by processing every leaf node in the timing forest. First, if the node is an aggressor output, then a simulation of that aggressor is performed, with all other aggressors held quiet, and the resulting waveform on the node is annotated, tagging the waveform with an indication of which exclusion set the aggressor belongs to. Second, if the node is an input then the node is annotated with the proper $T_{su}$ and $T_h$ values that will be used later for sensitivity window culling.

In the next operation, the method works from the leaf nodes towards the root nodes calculating the worst possible noise profile waveform considering how the delay uncertainty of an edge smears a child's noise waveform. Starting at each leaf node, the forest is traversed towards the root such that each internal node is processed only after all of its children are processed. The edge delay uncertainties between the node of interest and the children nodes are applied. If the child node contains waveforms, then each waveform is swept using the connected edge's min-max delay numbers, and if the child node contains sensitivity window numbers, then the waveforms are modified using the connected edge's min-max delay numbers.

As each node is processed, decisions must be made on how to collapse the various smeared child waveforms. The collapsing of waveforms with constraints can not occur at internal nodes because it is not known yet how the waveforms should be combined.

The results from the previous operation are annotated on the node being processed as follows: if the child contains only sensitivity window information then annotate the adjusted sensitivity numbers on the node being processed; if the children contain only waveforms, then merge them by summing any swept waveforms that are tagged with the same exclusion set id and annotate the summed waveforms on the node being processed (there can be multiple waveforms on both the children nodes and annotated on the node being processed); and if there are both a sensitivity window child and waveform children then sum the waveforms as above and then set any portion of the waveform that falls outside of the sensitivity window to zero. Annotate the resulting waveforms on the node being processed and also annotate the sensitivity window information for later use.

At this point each root node in the forest has one or more profile waveforms. Except for the case of exclusion relationships that cross unrelated clock boundaries, the waveforms can be further reduced. The constraint relationships restrict the set of valid I/O aggressor states possible. In the following operations, the optimal set of I/O aggressor states is determined while still respecting the relationship constraints.

Exclusive relationships are implemented by picking one exclusion set out of a group of exclusion sets. The first move in reducing the waveforms annotated on the root nodes is to identify each unique group of exclusion sets, where each group contains a number of exclusion sets for which only one may be selected. For each group within each tree in the forest, all exclusion sets are collapsed down to one waveform per unique group if possible, by taking the maximum value of all exclusions set in the group that only have member pins within the tree being processed, at each time instance. It should be noted that collapsing must not cross tree boundaries at this point. Taking the maximum value is used to collapse exclusion sets because it is known that only one set of pins can be active, while the others are not active. Every possible time must be observed to find the maximum noise possible from every set within the exclusion constraint. This results in a profile waveform indicating the maximum amount of noise possible at a given time when it is possible to select any one active group of pins.

Also for each group, sum together any waveform without exclusion relationships or reduced group waveforms that do not cross a tree boundary. At this point, each root node should have at most one profile waveform with no exclusion relationships and optionally a number of profile waveforms with exclusion relationships that cross tree boundaries. At this point, every valid combination of exclusion relations across tree boundaries must be enumerated and tested.

Typically there will not be very many exclusion relationships that cross tree boundaries so enumeration is a viable methodology. If too many exclusion relationships exist for efficient implementation using all possible combinations, other sub-optimal heuristics can be used while still remaining pessimistic. The active exclusion sets for each trial set are then collapsed. For each tree, a profile waveform is created by adding all waveforms remaining on the root node, ignoring those waveforms explicitly restricted by the enumeration and testing process.

Each root node now has one waveform. Using the fact that there are no phase relationships between different trees, there is freedom to choose any arbitrary alignment such that the noise is maximized. This is accomplished by finding the maximum noise for each tree individually and aligning the trees such that the maximums of each waveform are aligned. The sum of the maximums is the maximum amount of noise for the specified enumeration or trial test. Overall, the maximum amount of possible noise is equal to the maximum noise value from the entire enumeration process.

At this point, the method has calculated the worst case amount of noise present and the time at which the noise occurs, referenced to some root node. Additionally, the worst case relative alignment of signals with unrelated clocks is also known, and which exclusive sets that cross unrelated clock boundaries cause worst case noise. Next, it must be determined which exclusive sets are active for sets that do not cross unrelated clock boundaries. The maximum amount of noise at this point is known, but it is not known which active sets produced the noise as this information was lost when performing the maximum collapsing operation.

To obtain which active sets produced the maximum noise, each group of exclusive pin sets are examined for each tree root node. It is known that one set from each group is active while the others are inactive. Given that the time that the worst case noise event happens is known, each candidate set can be examined to find out the worst case noise that each set can induce at the given worst-case time. This information is contained within the profile waveforms of the children of the root node. Once each exclusive set is examined, the exclusive set that has the most noise is chosen and all other exclusive sets within the group are ignored. Once all exclusive set decisions are known, each node is processed in the forest and the waveforms are collapsed such that each node has only one profile waveform. Some nodes might end up with no waveforms if the nodes are aggressors, or only feed aggressors, that are not active.

The worst case switching time can then be extracted from the forest by traversing the tree starting at the root and replacing each edge minimum or maximum delay with a single delay number that represents the worst case alignment of aggressor pins. At this point, the magnitude of the worst case noise is known but not the aggressor time alignment that caused this noise. This information was lost when the time smearing of waveforms was performed, and the retrieval of this information is discussed below.

In general, unrelated clocks are represented as disconnected trees in a forest. Now that the relative alignment of unrelated clocks that causes the worst case alignment has been determined, a new common root node is created annotating the edges between individual trees root nodes and the common root node with the delay necessary to represent the previously identified worst case alignment. During the following traversal, the time that the worst case noise event occurs referenced to the node being processed time base is tracked. Initially, the time of the worst case noise peak from the final profile waveform is known. As edges in the timing graph are traversed, the method moves forward in time and must adjust the noise event's time accordingly.

For each node, the children of the node are examined in turn, replacing the connecting edge delay with a single number such that the noise at the locally reference peak noise time is maximal. Once each node has been processed, the switching time of any aggressor can be determined by the sum of the edge weights from the root node to the aggressor node.

The previously described method can be better understood via an illustrative example. FIG. 3 shows an example timing forest for a design with five outputs and one input. It can be seen that the design has two different unrelated clock domains, represented by root nodes $R_0$ and $R_1$. Within the related domains of $R_0$, I/Os A-D share a common piece of path uncertainty (the edge from $R_0$ to I). The tree in FIG. 3 will be used in an example to find the worst case aggressor alignment for noise on input D.

Figure 5:
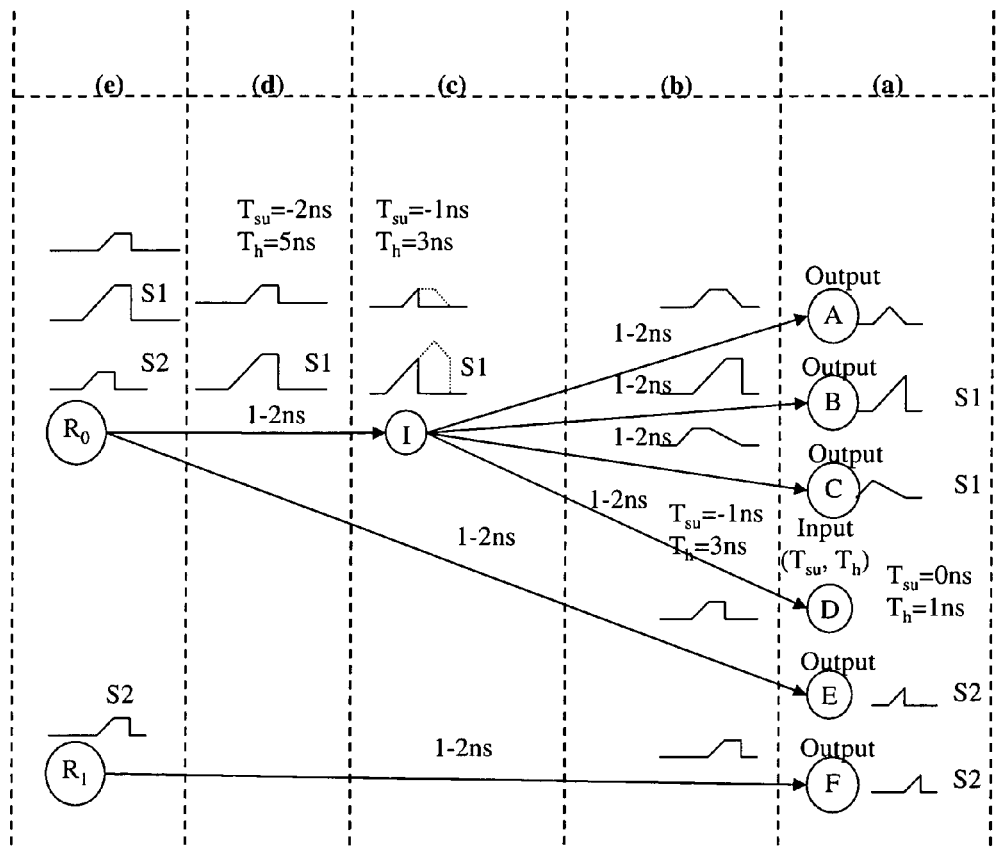
FIG. 5 shows pictorially the process of propagating back waveform profiles according to one embodiment.

First, the victim noise waveforms for each aggressor are simulated. FIG. 5 shows pictorially the process of propagating back waveform profiles according to one embodiment. Column (a) in FIG. 5 shows the waveforms calculated in the different simulations. Then, the waveforms are swept across the connected edge delay window and a profile waveform created. Since the maximum noise magnitude is being searched, the maximum profile waveform is taken, as shown in column (b) of FIG. 5. The input sensitivity window information is also propagated up the tree and adjusted according to the edge uncertainty.

The method continues by propagating back the profile waveforms towards the root taking care to keep the different exclusion sets separate. Column (c) in FIG. 5 shows the waveforms stored on node I. Node I has four children, three aggressor children and one sensitivity window child. The waveforms in column (b) are then added together at the corresponding node in column (c). It can be seen that the aggressor children belong to two exclusion sets. The waveforms for these sets must be kept separate. The result of the addition is the two waveforms above node I. The method further includes filtering the summated waveforms with the input sensitivity window. In this case, the setup and hold time requirements are −1 ns and 3 ns relative to node I's time base. The profile waveforms are forced to zero outside of this sensitivity window. The sensitivity window is also annotated on node I for later use.

Column (d) in FIG. 5 shows the uncertainty sweep process again and column (e) shows the back propagation process for node R0. At this stage, the waveforms due to the cross unrelated domain exclusive set S2 can not be further collapsed and the options must be enumerated to be tested separately.

Figure 6:
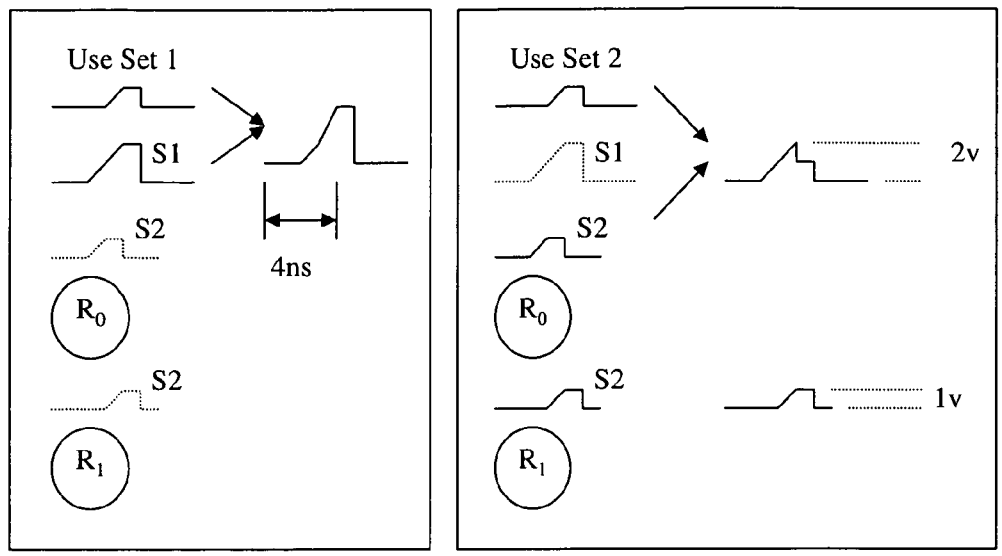
FIG. 6 describes the process of collapsing the timing forest.

FIG. 6 describes the process of collapsing the timing forest. There are two enumerated cases: 'use set 1' and 'use set 2'. It can be seen that in set 1 only tree R0 is active. For set 2, both trees have noise waveforms. The final collapsing phase for 'use set 2' requires that the maximum values of each profile waveform be aligned. In this case, it can be seen that a 0 phase shift between profile waveforms will result in the maximum noise value of 3v. In this simple example, both set 1 and set 2 options produce the same amount of peak noise so there is freedom to pick either one.

Figure 7:
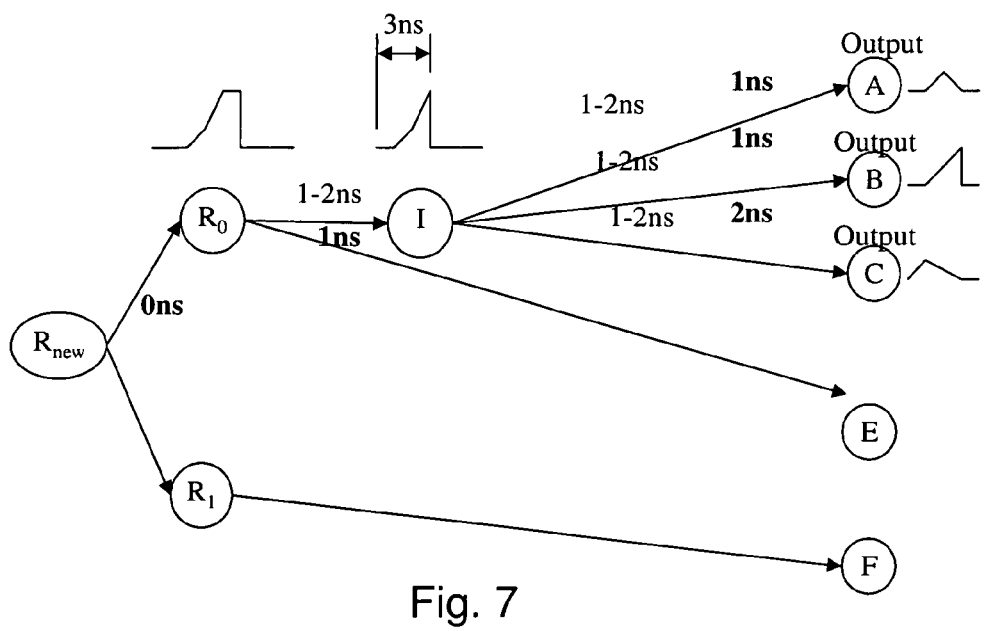
FIG. 7 shows one embodiment to propagate delays forward in the timing tree.

At this point, it is known that the maximum amount of noise is 3v and the method continues by figuring out which switching aggressor time causes this maximum amount of noise. From the profile waveform for 'use set 1,' it is observed that the maximum noise occurs at 4 ns. The timing tree must now be traversed in the forward direction assigning actual delays for each edge. FIG. 7 shows the remaining nodes in the timing tree that have active aggressors.

The forward traversal process initially looks at the root node. The question to be answered is, which edge delay causes the maximum value of each child profile waveform to be located at 4 ns? In this case, the answer is lns because the peak of the child profile happens at 3 ns. Then node I is processed, and must change the maximum noise time to be reference to node I, by subtracting the edge delay between $R_0$ and I to give 3 ns.

Figure 8:
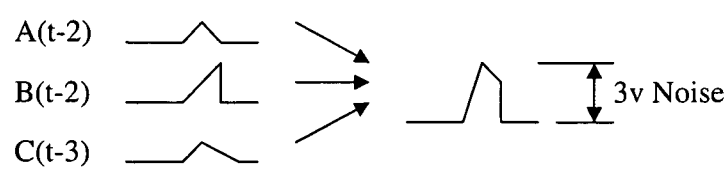
FIG. 8 depicts a case of worst-case noise alignment for three aggressor pins.

Then, each child node of I is examined in turn and the edge delays are set to maximize the voltage at 3 ns. The result is that the worst case edge delays are lns for outputs A and B and 2 ns for output C. FIG. 8 shows how adding together the switching time waveforms results in a waveform that has 3v noise, as expected.

The person skilled in the art will appreciate that the methods previously described for calculating worst induced voltage on a victim pin can be extended to the analysis of timing induced noise. Timing delays are defined as starting and ending at a specific voltage reference level. SSN noise can induce noise on a transitioning signal such that the signal either crosses the reference voltage earlier or later than if the noise was not present. In one embodiment, the methodology previously described for induced voltage noise is modified to support the determination of worst case timing noise.

Figure 9:
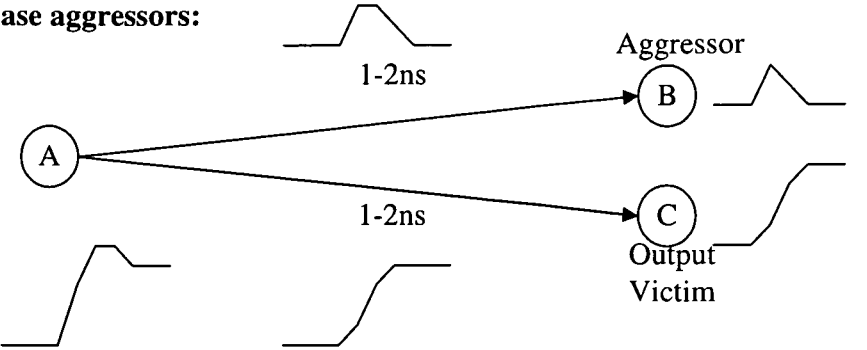
FIG. 9 depicts one embodiment of the invention for estimating timing noise using switching windows analysis.
Figure 9:
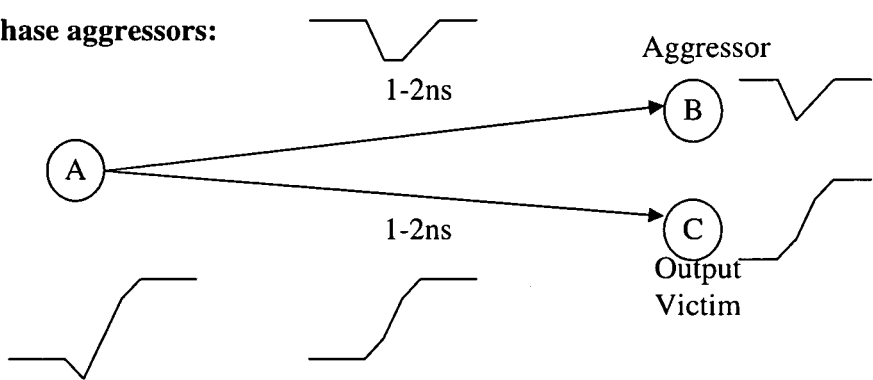
Figure 9:
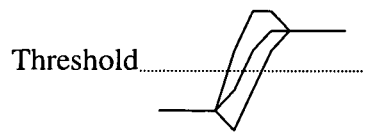

FIG. 9 depicts one embodiment of the invention for estimating timing noise using switching windows analysis. FIG. 9 illustrates a how the switching window method above can be modified to support timing noise instead of voltage noise. The example has two output pins, one aggressor and one victim. The first case, on top of FIG. 9, has an even phase aggressor that would be expected to constructively interfere with the victim. The second case, on bottom of FIG. 9, has an odd phase aggressor that should destructively interfere with the victim. The method annotates an output switching waveform on the victim and performs the same algorithm to generate a profile waveform on the root node as in the case of determining voltage noise previously discussed.

The bottom of FIG. 9 shows three profile waveforms overlaid, a nominal profile, an even aggressor profile and an odd aggressor profile. It is important to note that these are profile waveforms and not actual signal transition waveforms. The information that can be extracted is that for each time point, the worst possible voltage noise is equal to the value of the profile waveform. Conveniently, the timing problem is only concerned about how early or how late the first or last crossing of the timing reference threshold is. The profile waveforms can be used to directly read both the early and latest timing references.

In the case of the odd aggressor, it can be seen that noise is negative in sign rather than the typical positive sign used in most examples. This must be taken into consideration when determining the profile waveform. The sweeping process takes the minimum voltage and not the maximum voltage as below. In one embodiment, the victim output might have some switching variations not already encapsulated in the timing graph. For example transistor process models or temperature might change the expected nominal timing switching waveform. This can be handled by ensuring that the even phase aggressor case uses the fastest victim buffer transition waveform and that the odd phase aggressor case uses the slowest victim buffer transition waveform. The process of determining the worst case alignment is similar to the method for determining maximum voltage noise as mentioned above. One difference is that the time that the timing threshold is crossed is selected as the time to propagate forward through the graph rather than the time of the maximum amount of noise.

Figure 10:
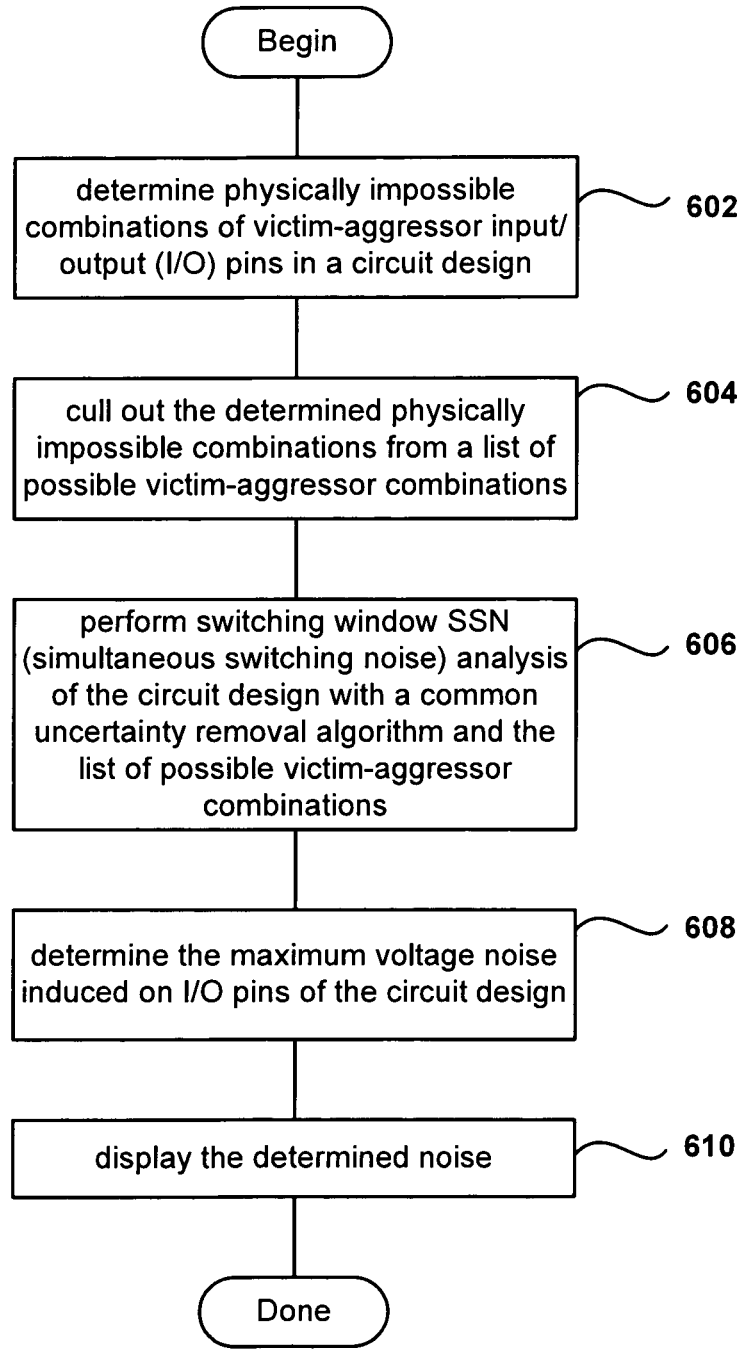
FIG. 10 shows the process flow for removing circuit analysis pessimism related to SSN in a circuit design tool, in accordance with one embodiment of the invention.

FIG. 10 shows the process flow for removing circuit analysis pessimism related to SSN in a circuit design tool, in accordance with one embodiment of the invention. In operation 602, the physically impossible combinations of victim-aggressor input/output (I/O) pins in a circuit design are determined. In one embodiment, the output enable groups and the intergroup exclusion constraints are used to determine the physically impossible combinations. Then, the physically impossible combinations are culled out a list of possible victim-aggressor combinations in operation 604. By reducing the number of aggressors, the pessimism is reduced with respect to the victim pin whose worst noise case is being calculated.

In operation 606, a switching window SSN analysis of the circuit design with a common uncertainty removal algorithm is performed. The switching window analysis takes into consideration the list of possible victim-aggressor combinations that was culled out in operation 604. In one embodiment, an example is provided in FIG. 5 depicting the process for switching window SSN analysis.

Once the timing tree is populated with the switching window analysis, the maximum voltage noise induced on I/O pins of the circuit design is determined in operation 608. FIG. 6 shows an example on how to calculate the maximum induced voltage noise on a victim pin. Additionally, FIG. 7 describes how to traverse the tree from the root to the leaf nodes to determine the alignment of induced noise from the different leaf nodes that cause the maximum induced voltage noise.

Figure 12:
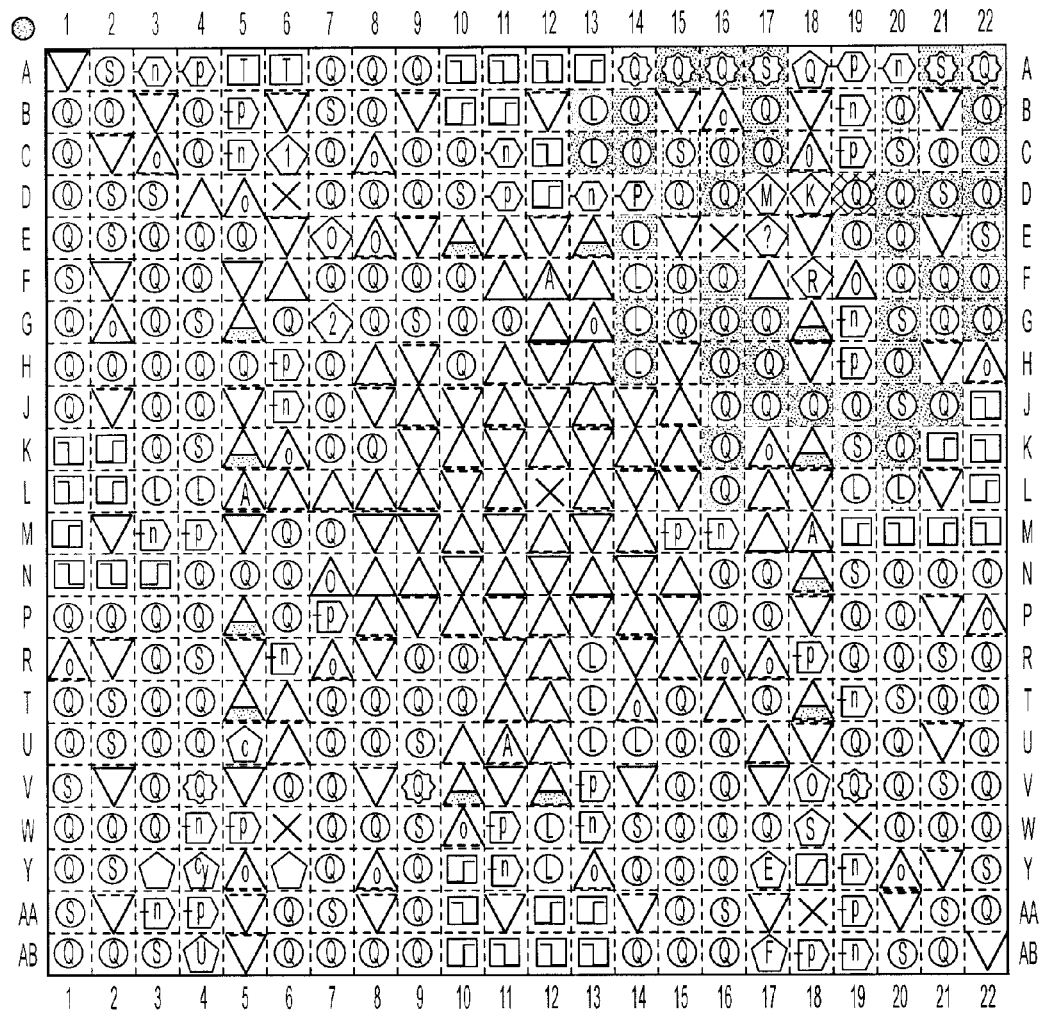
FIG. 12 is graphical representation of calculated SSN for the pins of an electronic component according to one embodiment.

After the maximum induced noise is calculated the results can be presented to the user in operation 610. The results can be presented in a variety of forms, such as giving a graphical representation of noise in a computer display as seen in FIG. 12, generating a printout, creating a file with the results, sending an email to the user, etc.

It will be obvious to one skilled in the art, that the present invention may be practiced without some or all of these specific details. In other instances, well known process operations have not been described in detail in order not to unnecessarily obscure the present invention.

Figure 11:
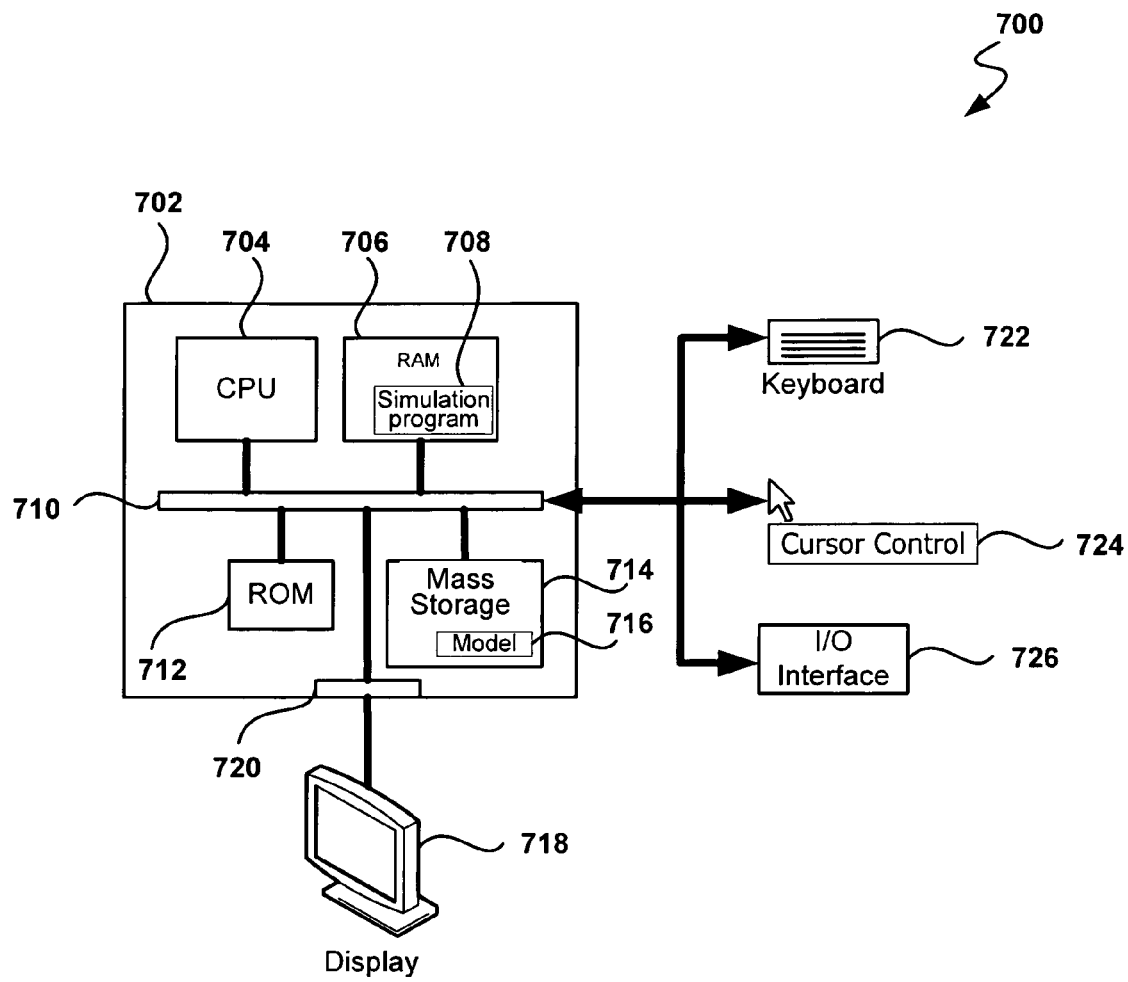
FIG. 11 is a simplified schematic diagram of a computer system for implementing embodiments of the present invention.

FIG. 11 is a simplified schematic diagram of computer system 700 for implementing embodiments of the present invention. It should be appreciated that the methods described herein may be performed with a digital processing system, such as a conventional, general-purpose computer system. Special purpose computers, which are designed or programmed to perform only one function may be used in the alternative. In addition, the computer system of FIG. 7 may be used to calculate SSN. The computer system includes a central processing unit (CPU) 704, which is coupled through bus 710 to random access memory (RAM) 706, read-only memory (ROM) 712, and mass storage device 714. SSN simulation program 708 resides in random access memory (RAM) 706, but can also reside in mass storage 714.

Mass storage device 714 represents a persistent data storage device such as a floppy disc drive or a fixed disc drive, which may be local or remote. SSN simulation model 716 resides in mass storage device 714, but can also reside in RAM 706 during processing. Model 716 may contain circuit models for SSN calculations. It should be appreciated that CPU 704 may be embodied in a general-purpose processor, a special purpose processor, or a specially programmed logic device. Display 718 is in communication with CPU 704, RAM 706, ROM 712, and mass storage device 714, through bus 710 and display interface 720. Of course, display 718 is configured to display the user interfaces described herein. Keyboard 722, cursor control 724, and input/output interface 726 are coupled to bus 710 in order to communicate information in command selections to CPU 704. It should be appreciated that data to and from external devices may be communicated through input output interface 726.

FIG. 12 is graphical representation of calculated SSN for the pins of an electronic component according to one embodiment. In this embodiment, a matrix representation of the different I/O pins on the device shows the level of noise at different pins by using different colors and shading intensity. In this example, SSN is more intense on the pins in the top right corner, thereby suggesting a relocation of some of these I/O pins to different physical locations in the electronic component to decrease the interference of aggressor pins. This representation is shown as way of example, but other representations are possible using different layouts, icons, colors, shadings, etc., as long as the functionality described herein is maintained. The representation can be shown on a monitor for a user.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments, described herein may be employed with any integrated circuit, such as processors and programmable logic devices (PLDs). Exemplary PLDs include but are not limited to a programmable array logic (PAL), programmable logic array (PLA), field programmable logic array (FPLA), electrically programmable logic devices (EPLD), electrically erasable programmable logic device (EEPLD), logic cell array (LCA), field programmable gate array (FPGA), application specific standard product (ASSP), application specific integrated circuit (ASIC), just to name a few.

The programmable logic device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be the STRATIXR II GX devices owned by the assignee.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method to analyze simultaneous switching noise (SSN) with a circuit design tool, the method comprising:
   determining physically impossible combinations of victim-aggressor input/output (I/O) pins in a circuit design, the determined physically impossible combinations being culled out of a list of possible victim-aggressor combinations;
   analyzing switching window SSN of the circuit design via simulation with an uncertainty removal algorithm and the list of possible victim-aggressor combinations, the analyzing comprising:
      preprocessing aggressor pins to create exclusion sets, wherein each exclusion set contains aggressor pins compatible with each other and having a same exclusive relationship with pins outside of the exclusion set, wherein the same exclusive relationships include a same intergroup exclusion constraints and same activity exclusion constraints;
      creating profile waveforms by sweeping simulation waveforms across switching windows for the aggressor pins in the exclusion sets;
      determining maximum voltage noise induced on I/O pins of the circuit design, using the profile waveforms; and
      displaying the determined maximum voltage noise, wherein at least one method operation is executed by a processor.

2. The method as recited in claim 1, wherein determining physically impossible combinations further comprises:
   selecting a victim pin;
   creating a list of candidate aggressor pins with every pin in the circuit design except the victim pin;
   culling any aggressors in the list of candidate aggressor pins that belong to an output enable group comprising the victim pin when the victim pin is bi-directional and configured as an input, wherein the output enable group consists of all pins that share a common output enable signal, wherein all the pins in the output enable group act as inputs, outputs, or tristated outputs at a same time; and
   culling any aggressors in the list of candidate aggressor pins that have an intergroup exclusion constraint with the victim pin when the victim pin is configured as an output, wherein the intergroup exclusion constraint exists when the output enable group of the victim and aggressor pins is prevented from being enabled at a same time.

3. The method as recited in claim 2, wherein output enable group is extracted from a netlist.

4. The method as recited in claim 1, wherein analyzing switching window SSN further comprises:
processing leaf nodes of a timing forest containing one or more timing trees, wherein each link between a child node and a parent of the child node includes delay information, the delay information including minimum and maximum delays, wherein the processing of leaf nodes comprises:
responsive to a leaf node being an aggressor output, performing a simulation for the leaf node with all other aggressors held quiet, annotating a resulting victim pin waveform from the simulation at the leaf node with an indication of which exclusion set the leaf node belongs to; and
responsive to the leaf node being an input victim pin, annotating the leaf node with a sensitivity window, the sensitivity window including setup and hold time values; and
traversing the timing forest from the leaf nodes to root nodes of the timing trees, wherein the traversing of a given node includes:
sweeping waveforms in every child node of the given node that contains waveforms using the delay information in the link between the given node and the child;
calculating sensitivity windows at the given node according to the delay information in the link between the given node and the child node for each child node of the given node that contains a sensitivity window;
calculating exclusion set waveforms at the given node by summing any swept waveforms for children nodes of the given node having a same exclusion set;
annotating on the given node any swept waveforms that have not been summed during the calculation of exclusion set waveforms; and
setting any portions of the waveforms at the given node that fall outside of the calculated sensitivity windows to zero when the given node has at least one child with sensitivity windows and at least one child with waveforms.

5. The method as recited in claim 1 further comprises:
identifying exclusion set groups, wherein only one exclusion set from the exclusion set group can be active as an output at one time;
creating combined exclusion set group waveforms associated with exclusion set groups at any root node by taking a maximum value at any time from all exclusion set waveforms in the exclusion set group when all the aggressor pins in all the exclusion sets in the exclusion set group belong to a same timing tree; and
adding at each node any waveforms corresponding to exclusion sets that have no intergroup exclusion relationships and any waveforms that are not combined exclusion set group waveforms and that do not cross timing trees.

6. The method as recited in claim 1 further comprises:
enumerating a list of trial cases by creating all possible waveform combinations of the remaining waveforms at the root nodes;
wherein creating all possible waveform combinations of the remaining waveforms includes selecting one exclusion set from each exclusive set group; and
analyzing each trial case in the list of trial cases to determine a maximum trial noise for the trial case; and
wherein determining the maximum voltage noise includes selecting a maximum of the maximum trial noises for all the trials.

7. The method as recited in claim 6, wherein analyzing each trial case further includes:
creating a profile waveform at each root node by adding all waveforms at each root node in the trial case;
aligning the maximums of the profile waveforms from all the root nodes; and
calculating the maximum trial noise by adding the maximums of the aligned profile waveforms.

8. The method as recited in claim 6 further comprises:
determining which exclusive sets of the exclusive sets that do not cross timing trees are active during a time of maximum noise, wherein the time of maximum noise is a time where the maximum voltage noise takes place, wherein the determining which exclusive sets are active further includes choosing one exclusive set from each exclusive set group at each root node that have the maximum noise at the time of maximum noise from all the waveforms at each root node.

9. The method as recited in claim 8 further comprises: determining a relative aggressor time alignment that causes the maximum voltage noise from possible aggressor time alignments, the determining the relative aggressor time alignment comprises:
selecting at each root node the exclusive set waveforms from the chosen exclusive sets; and
processing each node in the timing forest by collapsing the selected exclusive set waveforms resulting in each node in the timing forest having only one profile waveform.

10. The method as recited in claim 9 further comprises determining a worst case switching time including:
creating a new common root as a predecessor of all root nodes;
annotating a delay on edges to the new common root such that alignment of waveforms at the new common root causes the maximum voltage noise;
traversing a resulting tree starting at the new common root;
annotating edge delays at the link between a parent node and a child node to make the maximum noise of the profile waveform at the child node correspond to the time of maximum noise, the annotated edge delays constrained by the minimum and maximum delays of the link;
adjusting the profile waveform at each node according to the annotated edge delays; and
calculating a switching time for any aggressor pin that results in maximum noise at the selected victim pin caused by all the aggressor pins by adding all annotated edge delays from the timing tree root node to the any aggressor pin node.

11. A method to analyze simultaneous switching noise (SSN) in a circuit design tool, the method comprising:
determining physically impossible combinations of victim-aggressor input/output (I/O) pins in a circuit design, the determined physically impossible combinations being culled out of a list of possible victim-aggressor combinations;
analyzing switching window SSN of the circuit design via simulation with a common uncertainty removal algorithm and the list of possible victim-aggressor combinations, the analyzing comprising:
preprocessing aggressor pins to create exclusion sets, wherein each exclusion set contains aggressor pins compatible with each other and having a same exclusive relationship with pins outside of the exclusion set, wherein the same exclusive relationships include a same intergroup exclusion constraints and same activity exclusion constraints;

creating profile waveforms by sweeping simulation waveforms across switching windows for the aggressor pins in the exclusion sets;

determining maximum voltage noise induced on I/O pins of the circuit design, using the profile waveforms;

determining a worst timing noise induced on I/O pins of the circuit design; and displaying the determined worst timing noise, wherein at least one method operation is executed by a processor.

12. The method as recited in claim 11, wherein determining physically impossible combinations further comprises:

selecting a victim pin;

creating a list of candidate aggressor pins with every pin in the circuit design except the victim pin;

culling any aggressors in the list of candidate aggressor pins that belong to an output enable group comprising the victim pin when the victim pin is bi-directional and configured as an input, wherein the output enable group consists of all pins that share a common output enable signal, wherein all the pins in the output enable group act as inputs, outputs, or tristated outputs at a same time; and culling any aggressors in the list of candidate aggressor pins that have an intergroup exclusion constraint with the victim pin when the victim pin is configured as an output, wherein the intergroup exclusion constraint exists when the output enable group of the victim and aggressor pins is prevented from being enabled at a same time.

13. The method as recited in claim 12, wherein output enable group is extracted from a netlist.

14. The method as recited in claim 11, wherein analyzing switching window SSN further comprises:

processing leaf nodes of a timing forest that contains one or more timing trees, wherein each link between a child node and a parent of the child node includes delay information, the delay information including minimum and maximum delays, the processing of leaf nodes comprises:

responsive to a leaf node being an aggressor output, performing a simulation for the leaf node with all other aggressors held quiet, annotating a resulting victim pin waveform from the simulation at the leaf node with an indication of which exclusion set the leaf node belongs to;

responsive to the leaf node being an output victim pin, annotating a victim switching waveform;

traversing the timing forest from the leaf nodes to root nodes of the timing trees, wherein the traversing of a given node includes:

sweeping waveforms in every child node of the given node that contains waveforms using the delay information in the link between the given node and the child;

calculating exclusion set waveforms at the given node by summing any swept waveforms for children nodes of the given node having a same exclusion set; and annotating on the given node any swept waveforms that have not been summed during the calculation of exclusion set waveforms.

15. The method as recited in claim 14 further comprises:

identifying exclusion set groups, wherein only one exclusion set from the of exclusion set group can be active as an output at one time; and responsive to calculating a maximum positive timing noise:

creating positive combined exclusion set group waveforms associated with exclusion set groups at any root node by taking the maximum value at any time from all the exclusion set waveforms in the exclusion set group when all the aggressor pins in all the exclusion sets in the exclusion set group belong to a same timing tree;

adding at each node any waveforms corresponding to exclusion sets that have no intergroup exclusion relationships and any waveforms that are not positive combined exclusion set group waveforms and that do not cross timing trees, and responsive to calculating a minimum negative timing noise;

creating negative combined exclusion set group waveforms associated with exclusion set groups at any root node by taking the minimum value at any time from all the exclusion set waveforms in the exclusion set group when all the aggressor pins in all the exclusion sets in the exclusion set group belong to the same timing tree; and adding at each node any waveforms corresponding to exclusion sets that have no intergroup exclusion relationships and any waveforms that are not negative combined exclusion set group waveforms and that do not cross timing trees.

16. The method as recited in claim 11 further comprises:

enumerating a list of trial cases by creating all possible waveform combinations of the remaining waveforms at the root nodes, wherein creating all possible waveform combinations of the remaining waveforms includes selecting one exclusion set from each exclusive set group; and analyzing each trial case in the list of trial cases to determine one of a maximum positive trial noise or a minimum negative trial noise in each trial case, wherein determining the worst timing noise includes selecting a worst trial value from the trial cases, the worst trial value being one of the maximum from all the maximum positive trial noises or the minimum from all the minimum negative trial noises, wherein a time of worst noise is a time where the worst timing noise takes place.

17. The method as recited in claim 16, wherein analyzing each trial case further includes:

creating a profile waveform at each root node by overlaying all waveforms at each root node in the trial case;

aligning the profile waveforms from all the root nodes so the timing threshold is crossed at the time to propagate forward through the tree;

responsive to calculating the maximum positive trial noise then adding the maximums of the aligned profile waveforms; or responsive to calculating the minimum negative trial noise then adding the minimums of the aligned profile waveforms, wherein the worst possible timing noise at any time is equal to the value of the profile waveform at that time.

18. The method as recited in claim 16 further comprises:

determining which exclusive sets of the exclusive sets that do not cross timing trees are active during the time of worst timing noise, the determining which exclusive sets are active further comprises:

responsive to the worst timing noise being a positive timing noise, then choosing one exclusive set from each exclusive set group at each root node that have the maximum positive trial noise at the time of worst noise from all the waveforms at each root node; and responsive to the worst timing noise being a negative timing noise, then choosing one exclusive set from each exclusive set group at each root node that have the minimum negative trial noise at the time of worst noise from all the waveforms at each root node.

19. The method as recited in claim 18 further comprises:
determining a relative aggressor time alignment that causes the worst timing noise, the determining the relative aggressor time alignment comprises:
  selecting at each root node the exclusive set waveforms from the chosen exclusive sets; and
  processing each node in the timing forest by collapsing the selected exclusive set waveforms resulting in each node in the timing forest having only one profile waveform.

20. The method as recited in claim 19 further comprises determining a worst case timing noise including:
  creating a new common root as a predecessor of all root nodes; annotating a delay on edges to the new common root such that alignment of waveforms at the new common root causes the worst timing noise;
  traversing a resulting tree starting at the new common root;
  annotating edge delays at the link between a parent node and a child node to make the worst noise of the profile waveform at the child node correspond to the time of worst timing noise, the annotated edge delays constrained by the minimum and maximum delays of the link;
  adjusting the profile waveform at each node according to the annotated edge delays; and
  calculating a switching time for any aggressor pin that results in worst timing noise at the selected victim pin caused by all the aggressor pins by adding all annotated edge delays from the timing tree root node to the any aggressor pin node.

21. A system to analyze simultaneous switching noise (SSN) in a circuit design tool, the system comprising:
  a computer device having a processor;
  a display to show results of a simulation; and
  a memory, the memory comprises:
    a model of an electronic component for simulation; and
    a circuit simulation program;
  wherein the program instructions from the circuit simulation program when executed by the processor cause the processor to:
    determine physically impossible combinations of victim-aggressor input/output (I/O) pins in a circuit design, the determined physically impossible combinations being culled out of a list of possible victim-aggressor combinations;
    analyze switching window SSN of the circuit design via simulation with a common uncertainty removal algorithm and the list of possible victim-aggressor combinations, wherein the analyze switching window SSN further comprises:
      preprocess aggressor pins to create exclusion sets, wherein each exclusion set contains aggressor pins compatible with each other and having a same exclusive relationship with pins outside of the exclusion set, wherein the same exclusive relationships include a same intergroup exclusion constraints and same activity exclusion constraints;
      create profile waveforms by sweeping simulation waveforms across switching windows for the aggressor pins in the exclusion sets;
      determine maximum voltage noise induced on I/O pins of the circuit design, using the profile waveforms; and
      display the determined maximum voltage noise.

22. The system as recited in claim 21, wherein the-determine physically impossible combinations further comprises:
  select a victim pin;
  create a list of candidate aggressor pins with every pin in the circuit design except the victim pin;
  cull any aggressors in the list of candidate aggressor pins that belong to an output enable group comprising the victim pin when the victim pin is bi-directional and configured as an input, wherein the output enable group consists of all pins that share a common output enable signal, wherein all the pins in the output enable group act as inputs, outputs, or tristated outputs at a same time; and
  cull any aggressors in the list of candidate aggressor pins that have an intergroup exclusion constraint with the victim pin when the victim pin is configured as an output, wherein the intergroup exclusion constraint exists when the output enable group of the victim and aggressor pins is prevented from being enabled at the same time.

23. The system as recited in claim 21, wherein the program instructions to process leaf nodes of a timing forest that contains one or more timing trees, wherein each link between a child node and a parent of the child node includes delay information, the delay information including minimum and maximum delays, the process leaf nodes comprises:
  responsive to a leaf node being an aggressor output, performing a simulation for the leaf node with all other aggressors held quiet, annotating a resulting victim pin waveform from the simulation at the leaf node with an indication of which exclusion set the leaf node belongs to; and
  responsive to the leaf node being an input victim pin, annotating the leaf node with a sensitivity window, the sensitivity window including setup and hold time values;
  traverse the timing forest from the leaf nodes to root nodes of the timing trees, wherein the traversing of a given node includes:
    sweeping waveforms in every child node of the given node that contains waveforms using the delay information in the link between the given node and the child;
    calculating sensitivity windows at the given node according to the delay information in the link between the given node and the child node for each child node of the given node that contains a sensitivity window;
    calculating exclusion set waveforms at the given node by summing any swept waveforms for children nodes of the given node having a same exclusion set; and
    annotating on the given node any swept waveforms that have not been summed during the calculation of exclusion set waveforms; and
  set any portions of the waveforms at the given node that fall outside of the calculated sensitivity windows to zero when the given node has at least one child with sensitivity windows and at least one child with waveforms.

* * * * *